(12) United States Patent
Yen

(10) Patent No.: US 12,418,054 B2
(45) Date of Patent: Sep. 16, 2025

(54) SMART BATTERY DEVICE AND FAST CHARGING METHOD THEREOF

(71) Applicant: Quanta Computer Inc., Taoyuan (TW)

(72) Inventor: Wei-Ting Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 832 days.

(21) Appl. No.: 17/716,062

(22) Filed: Apr. 8, 2022

(65) Prior Publication Data
US 2023/0120942 A1    Apr. 20, 2023

(30) Foreign Application Priority Data
Oct. 19, 2021    (TW) ................................. 110138631

(51) Int. Cl.
*H01M 10/42*    (2006.01)
*H01M 10/46*    (2006.01)
*H02J 7/00*    (2006.01)

(52) U.S. Cl.
CPC ....... *H01M 10/4257* (2013.01); *H01M 10/46* (2013.01); *H02J 7/00302* (2020.01);
(Continued)

(58) Field of Classification Search
CPC ............. H01M 10/4257; H01M 10/46; H01M 2010/4271; H02J 7/00302; H02J 7/00304;
(Continued)

(56) References Cited

U.S. PATENT DOCUMENTS 6,043,630 A * 3/2000 Koenck ................... G06F 1/263
                                                    320/136
6,094,033 A * 7/2000 Ding .................... H02J 7/00711
                                                    320/132
(Continued)

FOREIGN PATENT DOCUMENTS

CN        104184196 A      12/2014
CN        107919690 A       4/2018
(Continued)

OTHER PUBLICATIONS

Extended European Search Report dated 2022-10-28, issued in application No. EP 22173418.9.
(Continued)

*Primary Examiner* — M Baye Diao
(74) *Attorney, Agent, or Firm* — McClure, Qualey & Rodack, LLP

(57) ABSTRACT

A battery device with a C-rate of 1C includes a battery cell, a protection chip, and a microcontroller. The protection chip is electrically connected to the battery cell, determines whether to activate the protection mechanism of the battery device according to the state of the battery cell. The microcontroller is electrically connected to the protection chip, detects the RSOC of the battery cell. When an external power supply is electrically coupled to the battery device, and the RSOC of the battery cell is lower than 50%, the microcontroller controls the battery cell to perform a fast charging not over 10 minutes. During the 10 minutes of fast charging, the protection chip activates the protection mechanism, or the microcontroller detects that the battery cell has changed from a CC state to a CV state, the microcontroller stops the fast charging and restores the C-rate of the battery cell to 1C.

10 Claims, 3 Drawing Sheets

(52) U.S. Cl.
CPC ...... *H02J 7/00304* (2020.01); *H02J 7/00308* (2020.01); *H02J 7/00309* (2020.01); *H02J 7/0049* (2020.01); *H01M 2010/4271* (2013.01)

(58) Field of Classification Search
CPC .. H02J 7/00308; H02J 7/00309; H02J 7/0049; H02J 7/00306; H02J 7/0031; H02J 7/00714; H02J 7/007194; H02J 7/007182; H02J 7/00712; Y02E 60/10; G01R 31/382; H02H 7/18
USPC ......................................................... 320/107
See application file for complete search history.

(56) References Cited

U.S. PATENT DOCUMENTS

| | | | | |
|---|---|---|---|---|
| 8,138,726 | B2* | 3/2012 | Partin | H02J 7/0071 |
| | | | | 320/160 |
| 9,356,461 | B2* | 5/2016 | Howard | H02J 7/007194 |
| 10,320,038 | B2 | 6/2019 | Nomura | |
| 10,541,542 | B2* | 1/2020 | Li | H02J 7/0068 |
| 11,152,810 | B2* | 10/2021 | Balarajashetty | H02J 7/007 |
| 11,237,215 | B2* | 2/2022 | Wang | H01M 4/0404 |
| 11,575,272 | B2 | 2/2023 | Kim | |
| 2010/0289457 | A1* | 11/2010 | Onnerud | H02J 7/00711 |
| | | | | 320/160 |
| 2014/0084856 | A1 | 3/2014 | Howard et al. | |
| 2018/0183247 | A1 | 6/2018 | Yamauchi et al. | |
| 2019/0356137 | A1* | 11/2019 | Balarajashetty | H02J 7/00712 |
| 2022/0115893 | A1* | 4/2022 | Ling | H02J 7/007192 |

FOREIGN PATENT DOCUMENTS

| | | | | |
|---|---|---|---|---|
| CN | 110212604 A | | 9/2019 | |
| CN | 113054728 A | * | 6/2021 | .......... H02J 7/00041 |
| JP | 2013179777 A | * | 9/2013 | ............. Y02E 60/12 |
| KR | 20170100526 A | | 9/2017 | |
| KR | 20210097531 A | | 8/2021 | |
| WO | 2016/196467 A1 | | 12/2016 | |

OTHER PUBLICATIONS

Chinese language office action dated Jun. 30, 2022, issued in application No. TW 110138631.
Korean language Notice of Allowance dated Jun. 12, 2024, issued in application No. KR 10-2022-0055485.

* cited by examiner

SMART BATTERY DEVICE AND FAST CHARGING METHOD THEREOF

CROSS REFERENCE TO RELATED APPLICATIONS

This application claims the benefit of Taiwan Application No. 110138631, filed on Oct. 19, 2021, the entirety of which is/are incorporated by reference herein.

BACKGROUND OF THE INVENTION

Field of the Invention

The present invention relates to an electronic device, and, in particular, to a battery device and fast charging method thereof.

Description of the Related Art

Electric vehicles (EV), 3C, energy storage systems (ESS), and information technology (IT) that use lithium batteries may all encounter different charging conditions. What is common, however, is that the charging time is often slow. Due to the current technology and the materials used in the present-day battery cells, existing lithium batteries must be charged in CC-CV mode. FIG. 1 is a charging curve diagram of a battery device. FIG. 1 discloses a charging capacity curve 100, a charging current curve 102, and a charging voltage curve 104 of a battery device.

As shown in FIG. 1, the battery device is charging at a C-rate of 1C. 0.6 hours after charging has started, the battery device is in CC mode. In the CC mode, the battery capacity curve 100 increases linearly. Beyond 0.6 hours since charging began, the battery device changes to CV mode. If the user experiences that it takes only 10 minutes to reach about 60% of battery capacity, the user may stop charging here, believing this to be acceptable. Therefore, how to avoid low-battery panic by charging the battery device instantly in CC mode or to reach a certain percentage of battery capacity has become an important issue.

BRIEF SUMMARY OF THE INVENTION

An embodiment of the present invention provides a battery device with a C-rate of 1C for charging. The battery device includes a battery cell, a protection chip, and a microcontroller. The protection chip is electrically connected to the battery cell. The protection chip determines whether to activate the protection mechanism of the battery device according to the state of the battery cell. The microcontroller is electrically connected to the protection chip, and detects the RSOC of the battery cell. When an external power supply is electrically coupled to the battery device, and the RSOC of the battery cell is lower than 50%, the microcontroller controls the battery cell to perform a fast charging not over 10 minutes. The fast charging is for the microcontroller to control the battery cell to charge at a C-rate of 1.7C to 1.8C. Within the 10 minutes of fast charging, the protection chip activates the protection mechanism, or the microcontroller detects that the battery cell has changed from a constant current (CC) state to a constant voltage (CV) state, the microcontroller stops the fast charging and restores the C-rate of the battery cell to 1C.

According to the battery device described above, the protection mechanism comprises an over-voltage protection (OVP), an over-current protection (OCP), an over-temperature protection (OTP), an under-voltage protection (UVP), an under-temperature protection (UTP), a reverse voltage protection, and a short circuit protection.

According to the battery device described above, the RSOC of the battery cell when the battery cell changes from the CC state to the CV state is 60% to 70%.

According to the battery device described above, the battery device further includes a charging switch. The charging switch is electrically coupled to the positive electrode of the battery cell. When the battery cell is being charged and the protection chip activates the OVP, the OCP, and the OTP of the protection mechanism, the protection chip turns off the charging switch.

The battery device described above further includes a discharging switch. When the battery cell is being charged and the protection chip activates the OCP, the OTP, the UVP, the UTP, the reverse voltage protection, and the short circuit protection of the protection mechanism, the protection chip turns off the discharging switch.

According to the battery device described above, the battery device further includes a protection device. The protection device is electrically connected between the positive electrode of the battery cell and the charging switch. When the protection chip activates the protection mechanism, but cannot turn off the charging switch or the discharging switch, the microcontroller directly disconnects the protection device.

The present invention also provides a fast charging method. The fast charging method is applied to a battery device with a C-rate of 1C for charging. The fast charging method includes the following steps. It detects that an external power supply is electrically coupled to the battery device. It controls the battery device to charge at a C-rate of 1C. It detects that Relative State-Of-Charge (RSOC) of the battery device is lower than 50%. It controls the battery device to perform a fast charging not over 10 minutes. The fast charging is to control the battery device to charge at a C-rate of 1.7C to 1.8C. It may stop the fast charging when a protection mechanism is activated during the fast charging. It may stop the fast charging when detecting that the battery device has changed from a constant current (CC) state to a constant voltage (CV) state. It may stop the fast charging when the fast charging has been performed for 10 minutes.

According to the fast charging method described above, the protection mechanism comprises an over-voltage protection (OVP), an over-current protection (OCP), an over-temperature protection (OTP), an under-voltage protection (UVP), an under-temperature protection (UTP), a reverse voltage protection, and a short circuit protection.

According to the fast charging method described above, the method further includes the following steps. It controls the battery device to discharge when detecting that the external power supply is not electrically coupled to the battery device. It does not perform the fast charging and continues to control the battery device to charge at a C-rate of 1C when detecting that the RSOC of the battery device is higher than or equal to 50%. It restores the C-rate of 1C to charge the battery device after stopping the fast charging.

According to the fast charging method described above, the method further includes the following actions. It outputs a first signal to a charging switch included in the battery device when the battery device is charging and the OVP, the OCP, the OTP of the protection mechanism have been activated, so that the charging switch is turned off. It outputs a second signal to a discharging switch included in the battery device when the battery device is charging and the OCP, the OTP, the UVP, the UTP, the reverse voltage protection, and the short circuit protection have been activated, so that the discharging switch is turned off. It outputs a third signal to a protection device when the protection mechanism has been activated but the charging switch or the discharging switch cannot be turned off, so that the protection device is electrically disconnected.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
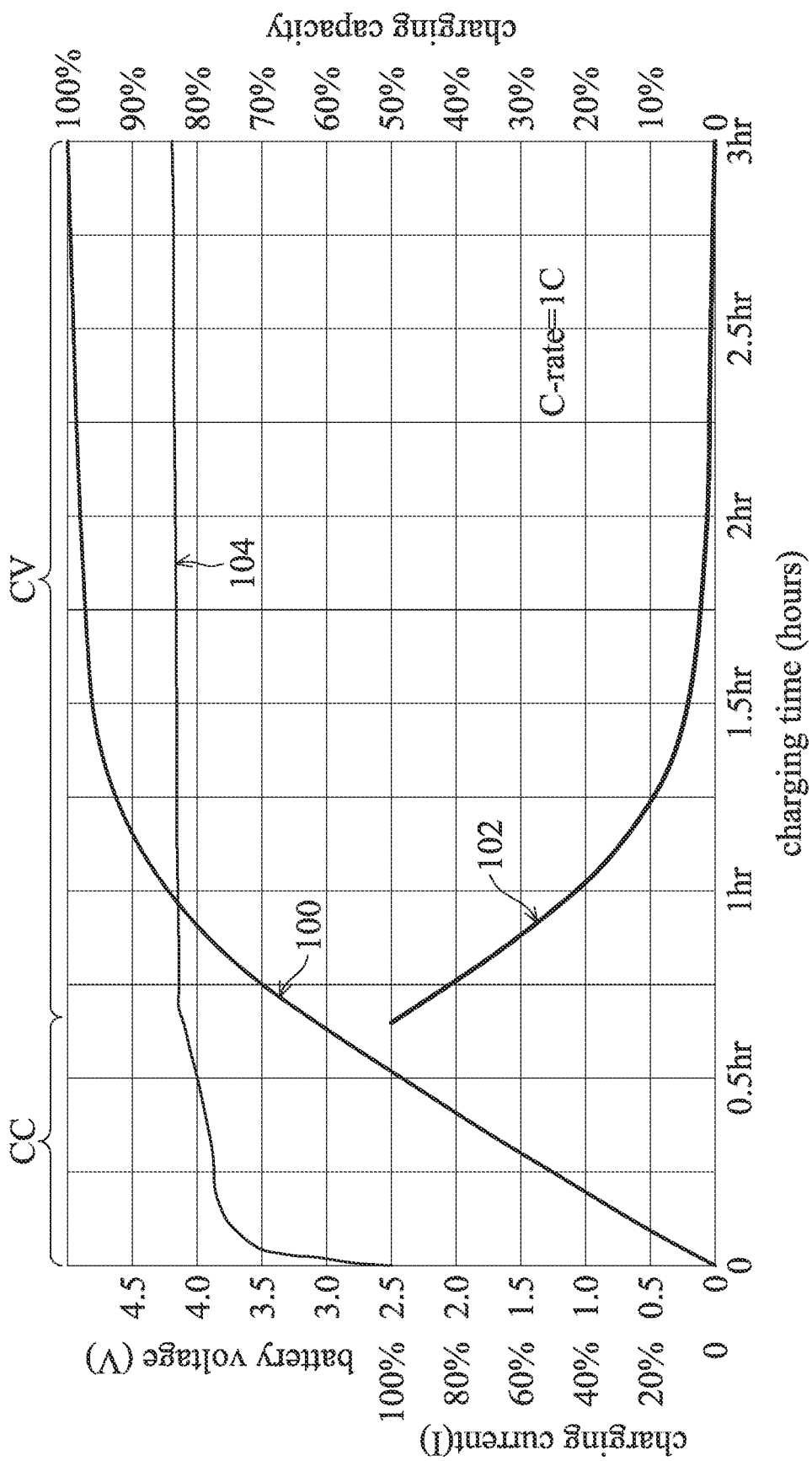
FIG. 1 is a charging curve diagram of a battery device.
Figure 2:
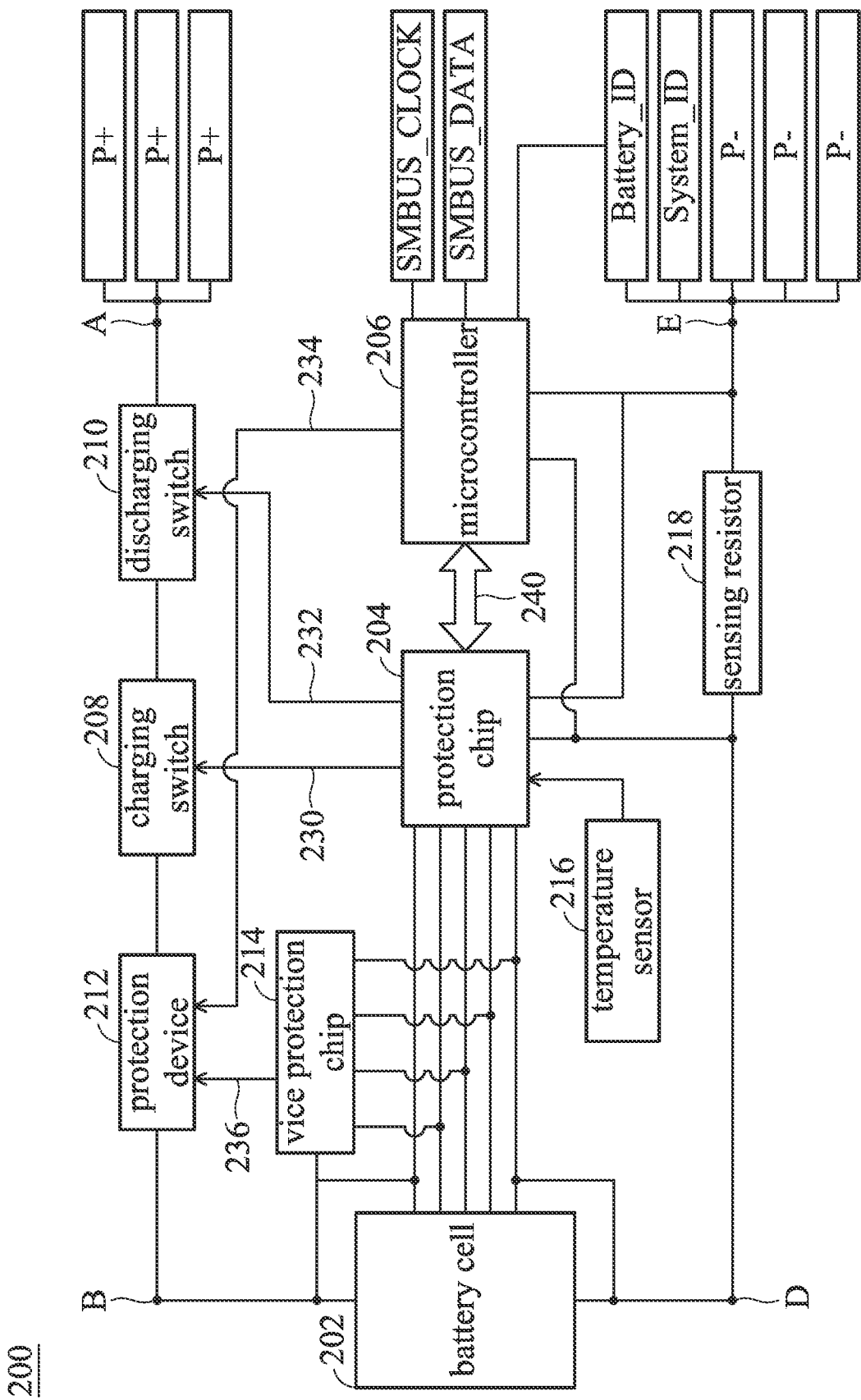
FIG. 2 is a schematic diagram of a battery device 200 in accordance with some embodiments of the present invention.

FIG. 2 is a schematic diagram of a battery device 200 in accordance with some embodiments of the present invention. As shown in FIG. 2, the battery device 200 includes a battery cell 202, a protection chip 204, a microcontroller 206, a charging switch 208, a discharging switch 210, a protection device 212, a vice protection chip 214, a temperature sensor 216, a sensing resistor 218, communication buses SMBUS_DATA and SMBUS_CLOCK, battery identification indicators BATTERY_ID and SYSTEM_ID, a positive electrode P+, and a negative electrode P−. The battery cell 202 converts the received electrical energy into chemical energy for storage, or converts the stored chemical energy into electrical energy for output. The protection chip 204 is electrically connected to the battery cell 202, and determines whether to activate the protection mechanism of the battery device 200 according the state of the battery cell 202 (based on, for example, the charging voltage, the charging current, or discharging current, etc.). In some embodiments, the protection mechanism includes an over-voltage protection (OVP), an over-current protection (OCP), an over-temperature protection (OTP), an under-voltage protection (UVP), an under-temperature protection (UTP), a reverse voltage protection, and a short circuit protection.

In some embodiments, when the battery cell 202 is being charged and the protection chip 204 activates the OVP, the OCP, and the OTP of the protection mechanism, the protection chip 204 outputs a signal 230 to the charging switch 208, so that the charging switch 208 is turned off, and the battery device 200 stops charging. In some embodiments, when the battery cell 202 is being discharged and the protection chip 204 activates the OCP, the OTP, the UVP, the UTP, the reverse voltage protection, and the short circuit protection, the protection chip 204 outputs a signal 232 to the discharging switch 210, so that the discharging switch 210 is turned off, and the battery device 200 stops discharging.

As shown in FIG. 2, the charging switch 208 is electrically between the protection device 212 and the discharging switch 210. The discharging switch 210 is electrically connected between the positive electrode P+ and the charging switch 208. The charging switch 208 changes its state according to the signal 230 from the protection chip 204. For example, if the signal 230 is at logic low level, such as "0", the charging switch 208 only allows current to flow from a node B to a node A, but prohibits current from the node A to the node B. If the signal 230 is at logic high level, such as "1", the charging switch 208 is in a fully conductive state. The discharging switch 210 changes its state according to the signal 232 from the protection chip 204. For example, if the signal 232 is at logic low level, such as "0", the discharging switch 210 only allows current to flow from the node A to the node B, but prohibits current from the node B to the node A. If the signal 232 is at logic high level, such as "1", the discharging switch 210 is in the fully conductive state.

The microcontroller 206 is electrically connected to the protection chip 204, and detects Relative State-Of-Charge (RSOC) of the battery cell 202. In some embodiments, the microcontroller 206 communicates with the protection chip 204 through a communication interface 240. For example, the microcontroller 206 can obtain information such as the charging and discharging current and the charging and discharging voltage of the battery cell 202 from the protection chip 204 through the communication interface 240. In some embodiments, the communication interface is and I$^2$C communication interface, but the present invention is not limited thereto. The microcontroller 206 can control electrical charge from the battery cell 202 to be output via the positive electrode P+ of the battery device 200 and be back to the battery cell 202 from the negative electrode P− of the battery device 200. Alternatively, the microcontroller 206 can control an external power supply (not shown) outside the battery device 200 to charge the battery cell 202.

Generally, in a normal charging and discharging process, the C-rate of a battery device 200 for charging is 1C, and the C-rate of a battery device 200 for discharging is 2C, but the present invention is not limited thereto. When the external power supply is electrically coupled to the battery device 200 and the RSOC of the battery cell 202 is lower than 50%, the microcontroller 206 controls the battery cell 202 to perform a fast charging not over 10 minutes. During the fast charging, the microcontroller 206 controls the battery cell 202 to charge at a C-rate of 1.7C to 1.8C. During the 10 minutes of fast charging, the protection chip 204 activates the protection mechanism, or the microcontroller 206 detects that the battery cell 202 has changed from a constant current (CC) state to a constant voltage (CV) state, the microcontroller 206 stops the fast charging and restores the C-rate of the battery cell 202 for charging to 1C at the same time. In some embodiments, the RSOC of the battery cell 202 is 60%~70% when the battery cell 202 changes from the CC state to the CV state.

In some embodiments, the battery device 200 is included in an electronic device having at least one processor. The electronic device may be, for example, a laptop, a tablet, a wearable device, or a smart phone. In some embodiments, the microcontroller 206 can communicate with the processor of the electronic device including the battery device 200 through the communication buses SMBUS_CLOCK and SMBUS_DATA. For example, the processor of the electronic device can adjust the maximum time (e.g., 10 minutes) and the C-rate (e.g., 1.7C~1.8C) for the microcontroller 206 to perform the fast charging through the communication buses SMBUS_CLOCK and SMBUS_DATA. In some embodiments, the processor of the electronic device including the battery device 200 can detect that the battery device 200 has been installed in the electronic device through the battery identification indicators BATTERY_ID and SYSTEM_ID of the battery device 200.

The temperature sensor 216 detects a temperature of the battery device 200, and sends information of the detected temperature to the protection chip 204. In some embodiments, the temperature sensor 216 is a temperature sensing chip. In some embodiments, the temperature sensor 216 includes a thermistor, whose resistance changes with temperature. The temperature sensor 216 provides a power to the thermistor, and converts the change in a voltage across the thermistor (corresponding to the change in resistance) into the change in temperature by measuring the voltage across the thermistor. In some embodiments, the microcontroller 206 can calculate the magnitude of a charging current in the charging mode by measuring the voltage across the sensing resistor 218 (for example, the voltage across nodes D and E).

Table 1 is a comparison table of capacity increments of the battery 200 per 10 minutes corresponding to different C-rates for charging in accordance with some embodiments of the present invention.

TABLE 1

| C-rate for charging (C) | Time (minutes) | Capacity (%) | Capacity increment per 10 minutes (%) | note |
| --- | --- | --- | --- | --- |
| 1.1 | 30 | 50 | 16.67 | |
| 1.5 | 20 | 50 | 25.00 | |
| 1.7~1.8 | 12 | 35 | 29.17 | the present invention |
| 2.5 | 10 | 40 | 40.00 | |

As shown in Table 1, when the microcontroller 206 controls the battery cell 202 to charge at a C-rate of 1.1C, the battery cell 202 can reach 50% of the battery capacity after 30 minutes of charging. Therefore, when the C-rate for charging is 1.1C, the capacity increment per 10 minutes of the battery device 200 is 16.67%. When the microcontroller 206 controls the battery cell 202 to charge at a C-rate of 1.5C, the battery cell 202 can reach 50% of the battery capacity after 20 minutes of charging. Therefore, when the C-rate for charging is 1.5C, the capacity increment per 10 minutes of the battery device 200 is 25.00%. When the microcontroller 206 controls the battery cell 202 to charge at a C-rate of 1.7C~1.8C, the battery cell 202 can reach 35% of the battery capacity after 12 minutes of charging. Therefore, when the C-rate for charging is 1.7C, the capacity increment per 10 minutes of the battery device 200 is 29.17%.

When the microcontroller 206 controls the battery cell 202 to charge at a C-rate of 2.5C, the battery cell 202 can reach 40% of the battery capacity after 10 minutes of charging. Therefore, when the C-rate for charging is 2.5C, the capacity increment per 10 minutes of the battery device 200 is 40%. According to the results in Table 1, when the C-rate for charging of battery device 200 is the higher, the capacity increment per 10 minutes of the battery device 200 is also higher. However, the present invention does not use a C-rate of 2.5C to charge the battery device 200, and the reasons are as follows, and as indicated in Table 2.

Table 2 is a comparison table of performance ratios of battery device 200 corresponding to different C-rates for charging in accordance with some embodiments of the present invention. The performance ratio is defined as the C-rate for charging divided by the capacity increment per minute.

TABLE 2

| C-rate for charging (C) | Capacity increment per 10 minutes (%) | Capacity increment per 1 minute (%) | Ratio between C-rate for charging and Capacity increment per 1 minute | note |
| --- | --- | --- | --- | --- |
| 1.1 | 16.67 | 1.667 | 1.52 | |
| 1.5 | 25.00 | 2.5 | 1.67 | |
| 1.7~1.8 | 29.17 | 2.917 | 1.72 | the present invention |
| 2.5 | 40.00 | 4 | 1.6 | |

As shown in Table 2, when the microcontroller 206 controls the battery cell 202 to charge at a C-rate of 1.1C, the performance ratio (that is, the ratio between the C-rate for charging and the capacity increment per minute) of the battery device 200 is 1.52. When the microcontroller 206 controls the battery cell 202 to charge at a C-rate of 1.5C, the performance ratio of the battery device 200 is 1.67. When the microcontroller 206 controls the battery cell 202 to charge at a C-rate of 1.7C~1.8C, the performance ratio of the battery device 200 is 1.72. When the microcontroller 206 controls the battery cell 202 to charge at a C-rate of 2.5C, the performance ratio of the battery device 200 is 1.6. As shown in Table 2, the present invention uses a C-rate of 1.7C~1.8C to charge the battery device 200, which can obtain the highest performance ratio (that is, the ratio between the C-rate for charging and the capacity increment per minute).

In FIG. 2, the protection device 212 is electrically connected between the positive electrode (node B) of the battery cell 202 and the charging switch 208. In some embodiments, when the protection chip 204 activates the protection mechanism but cannot turn off the charging switch 208 or discharging switch 210, or the protection chip detects that the core strips in the battery cell 202 are unbalance or abnormal, the microcontroller 206 can directly output a signal 234 to the protection device 212 to disconnect the protection device 212. In some embodiments, when the protection chip 204 activates the OVP of the protection mechanism but cannot turn off the charging switch 208 or discharging switch 210, the vice protection chip 214 can output a signal 236 to the protection device 212 to disconnect the protection device 212.

Figure 3:
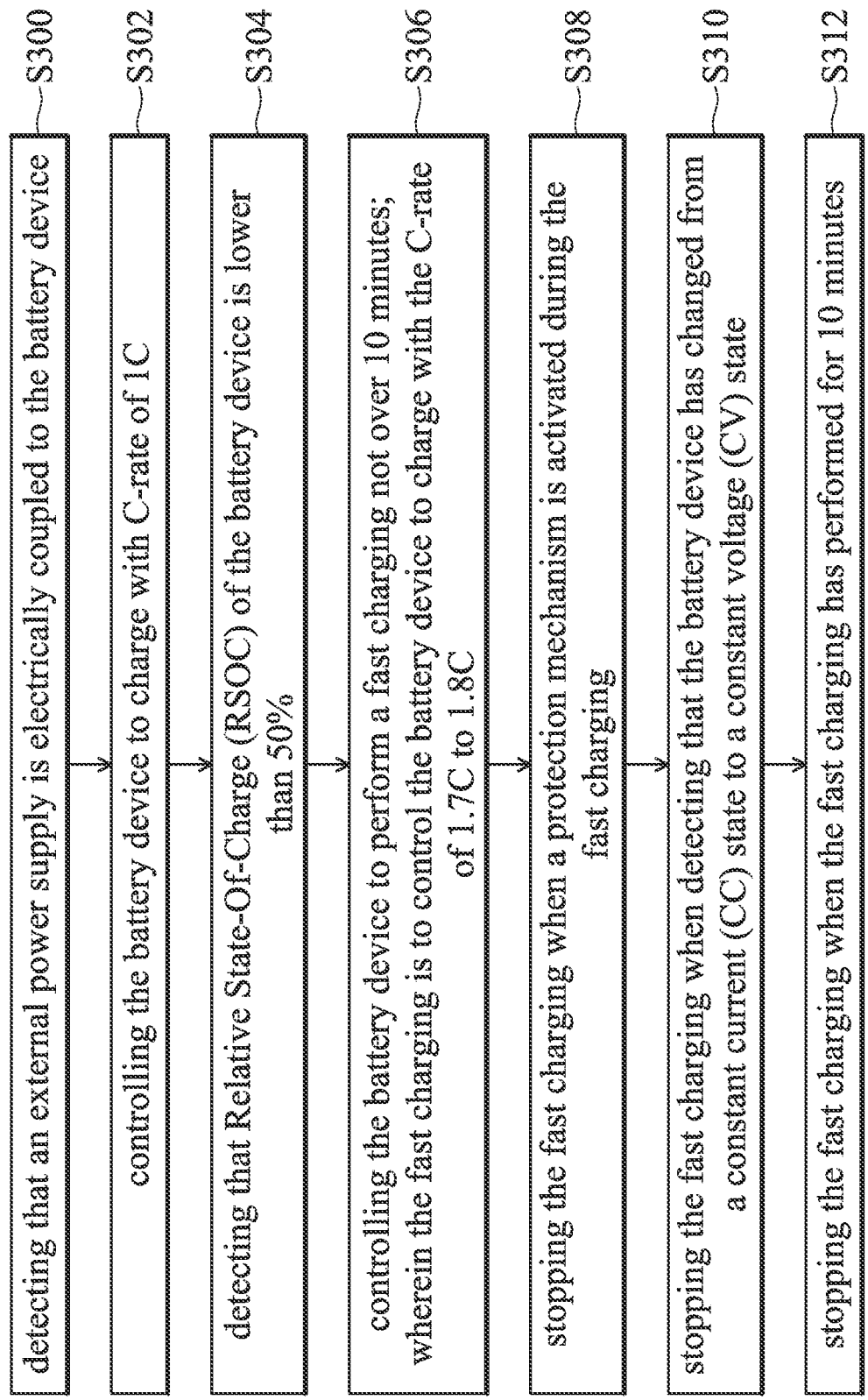
FIG. 3 is a flow chart of a fast charging method in accordance with some embodiments of the present invention.

FIG. 3 is a flow chart of a fast charging method in accordance with some embodiments of the present invention. The fast charging method of the present invention is suitable for a battery device with a C-rate of 1C for charging (e.g., the battery device 200 in FIG. 2). As shown in FIG. 3, the fast charging method includes the steps as follows. An external power supply, which is electrically coupled to the battery device, is detected (step S300). The battery device is controlled to charge at a C-rate of 1C (step S302). Relative State-Of-Charge (RSOC) of the battery device, which is lower than 50%, is detected (step S304). The battery device is controlled to perform a fast charging not over 10 minutes, the fast charging is to control the battery device to charge at a C-rate of 1.7C to 1.8C (step S306). The fast charging is stopped when a protection mechanism is activated during the fast charging (step S308). The fast charging is stopped when detecting that the battery device has changed from a constant current (CC) state to a constant voltage (CV) state (step S310). The fast charging is stopped when the fast charging has been performed for 10 minutes (step S312).

In some embodiments, steps S300~S312 are executed by the microcontroller 206 in FIG. 2. In step S300, if the fast charging method of the present invention does not detect that the external is electrically coupled to the battery device, the microcontroller (such as the microcontroller 206 in FIG. 2) controls the battery cell to discharge. That is, the battery device enters a discharging mode. In step S304, if the microcontroller detects that the RSOC of the battery device is higher than or equal to 50%, the fast charging method of the present invention does not perform the fast charging and continue to control the battery device to charge at a C-rate of 1C. In step S306, the protection mechanism comprises an over-voltage protection (OVP), an over-current protection (OCP), an over-temperature protection (OTP), an under-voltage protection (UVP), an under-temperature protection (UTP), a reverse voltage protection, and a short circuit protection. In step S312, after the microcontroller stops the fast charging, the microcontroller restores a C-rate of 1C to charge the battery device.

In some embodiments, when the battery device of the present invention (for example, the battery device 200 in FIG. 2) is being charged, and the OVP, the OCP, and the OTP of the protection mechanism are activated, the fast charging method of the present invention outputs a first signal (e.g., the signal 230) to a charging switch (e.g., the charging switch 208 in FIG. 2) included in the battery device, so that the charging switch is turned off.

In some embodiments, when the battery device of the present invention is being charged, and the OCP, the OTP, the UVP, the UTP, the reverse voltage protection, and the short circuit protection are activated, the fast charging method of the present invention outputs a second signal (e.g., the signal 232) to a discharging switch (e.g., the charging switch 210 in FIG. 2) included in the battery device, so that the discharging switch is turned off. In some embodiments, when the protection chip (e.g., the protection chip 204 in FIG. 2) has activated the protection mechanism, but cannot turn off the charging switch or the discharging switch (for example, damaged charging switch and/or damaged discharging switch), the fast charging method of the present invention outputs a third signal (e.g., the signal 234) to a protection device (such as the protection device 212 in FIG. 2) to disconnect the protection device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A battery device with a C-rate of 1C for charging, comprising:
   a battery cell;
   a protection chip, electrically connected to the battery cell, configured to determine whether to activate a protection mechanism of the battery device according to a state of the battery cell; and
   a microcontroller, electrically connected to the protection chip, configured to detect Relative State-Of-Charge (RSOC) of the battery cell;
   wherein when an external power supply is electrically coupled to the battery device, and the RSOC of the battery cell is lower than 50%, the microcontroller controls the battery cell to perform a fast charging not over 10 minutes; the fast charging is for the microcontroller to control the battery cell to charge at a C-rate of 1.7C to 1.8C;
   wherein during the 10 minutes of fast charging, the protection chip activates the protection mechanism, or the microcontroller detects that the battery cell has changed from a constant current (CC) state to a constant voltage (CV) state, and the microcontroller stops the fast charging and restores the C-rate of the battery cell to 1C at the same time.

2. The battery device as claimed in claim 1, wherein the protection mechanism comprises an over-voltage protection (OVP), an over-current protection (OCP), an over-temperature protection (OTP), an under-voltage protection (UVP), an under-temperature protection (UTP), a reverse voltage protection, and a short circuit protection.

3. The battery device as claimed in claim 1, wherein the RSOC of the battery cell when the battery cell changes from the CC state to the CV state is 60% to 70%.

4. The battery device as claimed in claim 2, further comprising:
   a charging switch, electrically coupled to the positive electrode of the battery cell;
   wherein when the battery cell is being charged and the protection chip activates the OVP, the OCP, and the OTP of the protection mechanism, the protection chip turns off the charging switch.

5. The battery device as claimed in claim 4, further comprising:
   a discharging switch, electrically connected between the charging switch and the positive electrode of the battery cell;
   wherein when the battery cell is being charged and the protection chip activates the OCP, the OTP, the UVP, the UTP, the reverse voltage protection, and the short circuit protection of the protection mechanism, the protection chip turns off the discharging switch.

6. The battery device as claimed in claim 5, further comprising:
   a protection device, electrically connected between the positive electrode of the battery cell and the charging switch;
   wherein when the protection chip activates the protection mechanism, but cannot turn off the charging switch or the discharging switch, the microcontroller directly disconnects the protection device.

7. A fast charging method, applied to a battery device with a C-rate of 1C for charging, comprising:
   detecting that an external power supply is electrically coupled to the battery device;
   controlling the battery device to charge at a C-rate of 1C;
   detecting that the Relative State-Of-Charge (RSOC) of the battery device is lower than 50%;
   controlling the battery device to perform a fast charging not over 10 minutes; wherein the fast charging is to control the battery device to charge at a C-rate of 1.7C to 1.8C;
   stopping the fast charging when a protection mechanism is activated during the fast charging;
   stopping the fast charging when detecting that the battery device has changed from a constant current (CC) state to a constant voltage (CV) state; and stopping the fast charging when the fast charging has been performed for 10 minutes.

8. The fast charging method as claimed in claim 7, wherein the protection mechanism comprises an over-voltage protection (OVP), an over-current protection (OCP), an over-temperature protection (OTP), an under-voltage protection (UVP), an under-temperature protection (UTP), a reverse voltage protection, and a short circuit protection.

9. The fast charging method as claimed in claim 7, further comprising:
controlling the battery device to discharge when detecting that the external power supply is not electrically coupled to the battery device;
not performing the fast charging and continuing to control the battery device to charge at a C-rate of 1C when detecting that the RSOC of the battery device is higher than or equal to 50%; and
restoring a C-rate of 1C to charge the battery device after stopping the fast charging.

10. The fast charging method as claimed in claim 8, further comprising:
outputting a first signal to a charging switch included in the battery device when the battery device is charging and the OVP, the OCP, and the OTP of the protection mechanism have been activated, so that the charging switch is turned off;
outputting a second signal to a discharging switch included in the battery device when the battery device is charging and the OCP, the OTP, the UVP, the UTP, the reverse voltage protection, and the short circuit protection have been activated, so that the discharging switch is turned off; and
outputting a third signal to a protection device when the protection mechanism has been activated but the charging switch or the discharging switch cannot be turned off, so that the protection device is electrically disconnected.

* * * * *